(12) United States Patent
Zou

(10) Patent No.: US 11,914,239 B2
(45) Date of Patent: Feb. 27, 2024

(54) MULTI-SCREEN AND DISPLAY DEVICE

(71) Applicant: Shenzhen China Star Optoelectronics Semiconductor Display Technology Co., Ltd., Guangdong (CN)

(72) Inventor: Guangnan Zou, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 337 days.

(21) Appl. No.: 17/416,188

(22) PCT Filed: May 21, 2021

(86) PCT No.: PCT/CN2021/095035
§ 371 (c)(1),
(2) Date: Jun. 18, 2021

(87) PCT Pub. No.: WO2022/174529
PCT Pub. Date: Aug. 25, 2022

(65) Prior Publication Data
US 2023/0213804 A1 Jul. 6, 2023

(30) Foreign Application Priority Data
Feb. 22, 2021 (CN) .......................... 202110199518.2

(51) Int. Cl.
| G02F 1/13 | (2006.01) |
| G02F 1/1333 | (2006.01) |
| G06F 3/14 | (2006.01) |

(52) U.S. Cl.
CPC .... *G02F 1/13336* (2013.01); *G02F 1/133308* (2013.01); *G06F 3/1423* (2013.01); *G09G 2300/026* (2013.01)

(58) Field of Classification Search
CPC .......... G02F 1/13336; G02F 1/133308; G06F 3/1423; G09G 2300/026
See application file for complete search history.

(56) References Cited

U.S. PATENT DOCUMENTS

| 2013/0176352 A1 | 7/2013 | Watanabe |
| 2016/0327827 A1 | 11/2016 | Yun |
| 2017/0017108 A1* | 1/2017 | Shin .................. G02F 1/133615 |
| 2017/0123274 A1* | 5/2017 | Jeong ................. G02F 1/133308 |

(Continued)

FOREIGN PATENT DOCUMENTS

| CN | 102478728 A | 5/2012 |
| CN | 102809841 A | 12/2012 |
| CN | 103901643 A | 7/2014 |

(Continued)

*Primary Examiner* — Liliana Cerullo

(57) ABSTRACT

The present application provides a multi-screen and a display device. The multi-screen includes at least two display screens spliced with each other. The display screens include an outer bezel, a backlight module, and a display panel. The outer bezel includes a first frame and a second frame opposite to the first frame. The backlight module includes a light-emitting element disposed near the first frame. The display module includes a chip on film disposed near the first frame. At least one of adjacent two of the display screens is spliced along the second frame.

18 Claims, 2 Drawing Sheets

(56) References Cited

U.S. PATENT DOCUMENTS

2017/0315408 A1* 11/2017 Lee .................. G02F 1/133605
2019/0303085 A1   10/2019 Nagayama

FOREIGN PATENT DOCUMENTS

| CN | 104155784 A | 11/2014 |
|----|-------------|---------|
| CN | 104516136 A | 4/2015 |
| CN | 104851373 A | 8/2015 |
| CN | 105259976 A | 1/2016 |
| CN | 105788464 A | 7/2016 |
| CN | 207199233 U | 4/2018 |
| CN | 209343699 U | 9/2019 |
| CN | 110379314 A | 10/2019 |
| CN | 212460249 U | 2/2021 |
| CN | 112817174 A | 5/2021 |
| TW | 201409308 A | 3/2014 |

* cited by examiner

MULTI-SCREEN AND DISPLAY DEVICE

The present application claims priority of a China patent application No. 202110199518.2 filed with the China National Intellectual Property Administration on Feb. 22, 2021, titled "MULTI-SCREEN AND DISPLAY DEVICE", the contents of which are incorporated in the present application by reference in its entirety.

FIELD OF INVENTION

The present application relates to a field of display technologies, especially to a multi-screen and a display device.

BACKGROUND OF INVENTION

With widespread display technologies, a demand for large-size display screens is also growing. At present, it is difficult for a size of a single display screen to exceed 80 inches. Therefore, a multi-screen has become a feasible way to achieve large-size displays.

The multi-screen splices display screens of smaller sizes in an array to form a display screen of a larger size. Therefore, a certain number of display screens can be selected according to actual needs to be spliced into large screens of different sizes to meet different application scenarios. Furthermore, multi-screen will form a splicing gap at a spliced portion of two display screens, and a width of the splicing gap is a sum of frame widths of the two display screens. Limited by characteristics of a structure of the display screens, a frame of the display screens has no display function. Therefore, a complete display image of the multi-screen would be split by the splicing gap, wherein the larger the width of the splicing gap is, the greater the splitting effect on the display image is, and the worse the display quality of multi-screen is.

SUMMARY OF INVENTION

Technical Issue

A technical issue of poor multi-screen display effect due to a great width of a splicing gap existing in a conventional multi-screen.

Technical Solution

The present application provides a multi-screen and a display device for easing the issue of a width of splicing gaps existing in the conventional multi-screen to result in poor display effect of the multi-screen.

the present application provides a multi-screen, comprising at least two display screens spliced together, each of the display screens comprising:

an outer bezel, comprising a first frame and a second frame opposite to the first frame;
a backlight module, disposed in a bezel body of the outer bezel, and comprising a light-emitting element, wherein the light-emitting element is disposed near the first frame; and
a display module disposed in the bezel body of the outer bezel, located on a light exiting surface of the backlight module, and comprising a display panel and a chip on film electrically connected to the display panel, wherein the chip on film is disposed near the first frame;
wherein at least one of adjacent two of the display screens is spliced along the second frame.

In the multi-screen of the present application, the light-emitting element and the chip on film are disposed on the same side of the display screens.

In the multi-screen of the present application, the display screens comprise a first display screen and a second display screen, the second frame of the first display screen is horizontally spliced with the first frame of the second display screen.

In the multi-screen of the present application, the display screens further comprise a third display screen, the first frame of the third display screen is spliced with the second frame of the second display screen.

In the multi-screen of the present application, a light exiting surface of the display panel of the first display screen and a light exiting surface of the display panel of the second display screen are coplanar.

In the multi-screen of the present application, a light exiting surface of the display panel of the first display screen, a light exiting surface of the display panel of the second display screen, and a light exiting surface of the display panel of the third display screen are coplanar.

In the multi-screen of the present application, the display screens comprise a first display screen and a second display screen, the second frame of the first display screen is spliced with the second frame of the second display screen.

In the multi-screen of the present application, the first frame comprises a first end and a second end opposite to the first end, the first display screen inputs an initial display signal through the first end of the first display screen, and the second display screen inputs an initial display signal through the second end of the second display screen.

In the multi-screen of the present application, a width of the first frame is greater than a width of the second frame.

In the multi-screen of the present application, the width of the first frame is twice the width of the second frame.

In the multi-screen of the present application, a plane on which the light exiting surface of the display panel is located serves as a reference plane, and an orthographic projection of the first frame on the reference plane covers an orthographic projection of the light-emitting element on the reference plane.

In the multi-screen of the present application, the orthographic projection of the first frame on the reference plane covers an orthographic projection of the chip on film on the reference plane.

In the multi-screen of the present application, the backlight module further comprises a rear frame and an optical module, and the light-emitting element and the optical module are disposed in the rear frame.

In the multi-screen of the present application, the rear frame comprises a bottom plate and a side plate, and the side plate is disposed along the first frame and the second frame.

In the multi-screen of the present application, the light-emitting element is disposed on a side of the side plate facing the optical module.

In the multi-screen of the present application, the chip on film is disposed on a side of the display screen near the first frame.

In the multi-screen of the present application, the display panel comprises a display region and a non-display region, and an orthographic projection of the outer bezel on the display panel covers the non-display region.

In the multi-screen of the present application, an aperture is defined in the outer bezel, and an orthographic projection of the aperture of the outer bezel on the display panel covers the display region.

The present application further provides a display device comprising a first display screen and a second display screen spliced with the first display screen;

wherein each of the first display screen and the second display screen comprises an outer bezel, a backlight module disposed in a bezel body of the outer bezel, and a display module disposed on a light exiting surface of the backlight module;

wherein the outer bezel comprises a first frame and a second frame opposite to the first frame;

wherein the backlight module comprises a light-emitting element, and the light-emitting element is disposed near the first frame;

wherein the display module comprises a display panel and a chip on film electrically connected to the display panel, and the chip on film is disposed near the first frame;

wherein a width of the first frame is greater than a width of the second frame; and wherein the second frame of the first display screen is spliced with the second frame of the second display screen.

Advantages

In the multi-screen and the display device provided by the present application, the multi-screen comprises at least two display screens spliced to each other. The display screens comprise an outer bezel, a backlight module, and a display panel. The outer bezel comprises a first frame and a second frame opposite to the first frame. The backlight module comprises a light-emitting element disposed near the first frame. The display module comprises a chip on film disposed near the first frame. At least one of adjacent two of the display screens is spliced along the second frame. The present application, by optimizing the locations of the chip on film and the light-emitting element in the display screens, makes the width of the first frame greater than the width of the second frame, and employs the second frame as a splicing edge to make the multi-screen have a smaller splicing gap, which improves display quality and aesthetics of the multi-screen.

DETAILED DESCRIPTION OF PREFERRED EMBODIMENTS

Figure 1:
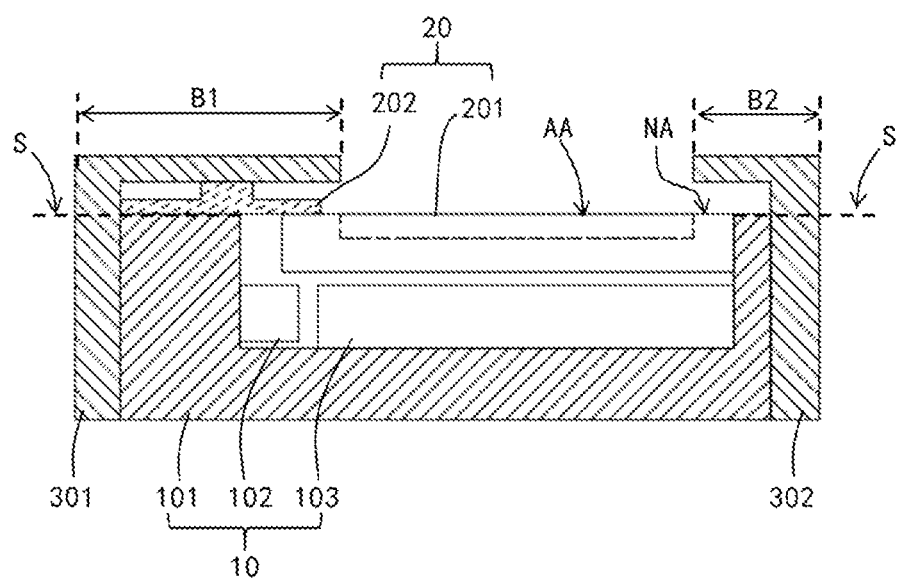
FIG. 1 is a schematic structural view of a display screen provided by an embodiment of the present application.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention.

In the figures, units with similar structures are marked with the same reference characters.

An embodiment of the present application provides a multi-screen and a display device, the multi-screen comprises at least two display screens spliced to each other. The display screens comprise an outer bezel, a backlight module, and a display panel. The outer bezel comprises a first frame and a second frame opposite to the first frame. The backlight module comprises a light-emitting element disposed near the first frame. The display module comprises a chip on film disposed near the first frame. At least one of adjacent two of the display screens is spliced along the second frame. The present application, by optimizing the locations of the chip on film and the light-emitting element in the display screens, makes the width of the first frame greater than the width of the second frame, and employs the second frame as a splicing edge to make the multi-screen have a smaller splicing gap, which improves display quality and aesthetics of the multi-screen.

With reference to FIG. 1, FIG. 1 is a schematic structural view of a display screen provided by an embodiment of the present application. The display screen comprises a backlight module 10, display module 20, and an outer bezel. The outer bezel comprises a first frame 301 and a second frame 302 opposite to the first frame 301. The backlight module 10 is configured to provide a backlight source to guarantee normal display of the display module The display module 20 is disposed to correspond to a light exiting surface of the backlight module 10 and is configured to perform a display function. The outer bezel is disposed securely on a light exiting surface and a side surface of the display screens and is configured to fix and protect the backlight module 10 and the display module 20.

The backlight module 10 comprises a rear frame 101, a light-emitting element 102, and an optical module 103. The rear frame 101 is a frame-shaped structure composed of a bottom plate and a side plate and including an aperture, and is configured to accommodate various functional elements in the backlight module 10. The side plate of the rear frame 101 is disposed at least along the first frame 301 and the second frame 302. The light-emitting element 102 and the optical module 103 are disposed in a bezel body of the rear frame 101 encompassed by the side plate and the bottom plate. The rear frame 101 provides support and protection for each functional element in the backlight module 10.

The light-emitting element 102 is disposed near the first frame 301. Specifically, the light-emitting element 102 is disposed in the bezel body of the rear frame 101, and is disposed along the side plate of the rear frame 101 near the first frame 301. The light-emitting element 102 can be fixed on the side plate of the rear frame 101 through thermal adhesive. Thermal adhesive is configured to conduct heat generated from the light-emitting element 102 to the rear frame 101 for dissipation to prevent damages to the light-emitting element 102 due to excessively high temperature. Optionally, the light-emitting element 102 can be an LED light strip composed of a plurality of light emitting diodes. Light emitted by the LED light strip enters the optical module 103 along a direction parallel to the bottom plate of the rear frame 101 to guarantee a maximum light utilization rate of the optical module 103. In the present embodiment, disposing the light-emitting element 102 near the first frame 301 makes a space occupied by the light-emitting element 102 concentrated near the first frame 301 for creating conditions allowing the second frame 302 of the display screens to have a smaller width.

The optical module 103 is disposed in the bezel body of the rear frame 101, and is flush with the light-emitting element 102. The optical module 103 is configured to convert parallel light emitted by the light-emitting element 102 into multi-directional light distributed evenly inside the optical module 103 by processes of transmission, refraction, reflection, etc., and emit the light out from a light exiting surface of the optical module 103. The light exiting surface of the optical module 103 faces the display module 20 to provide the display module 20 with an area light source. Optionally, the optical module 103 comprises a light guide plate, a diffuser plate, a prism sheet, and a brightness enhancement film. The light guide plate is configured to transmit light emitted by the light-emitting element 102 to the diffuser plate. The diffuser plate, the prism sheet, and the brightness enhancement film are configured to refract, reflect, and diffuse the light transmitted by the light guide plate many times, and finally concentrate light in a predetermined range and emit out the light while improving brightness of exiting light of the backlight module 10.

The display module 20 comprises a display panel 201 and a chip on film 202 electrically connected to the display panel 201. The display panel 201 is configured to achieve a display function of the display screens. Optionally, the display panel 201 comprises a display region AA and a non-display region NA, the display region AA is a region of the display panel 201 capable of displaying image. The non-display region NA can be disposed on a side edge of the display region AA, and various wires and functional elements connected to the display region AA are disposed therein. Furthermore, the display panel 201 can be a liquid crystal display panel, and comprises a thin film transistor array substrate and a color filter substrate disposed oppositely and a liquid crystal layer disposed between the thin film transistor array substrate and the color filter substrate. Liquid crystals are disposed in the liquid crystal layer. The thin film transistor array substrate is configured to provide an electrical field effect. The liquid crystals under the electrical field effect rotate in different angles to further change a path of light extending through the liquid crystal layer. Then, a color filtering effect of the color filter substrate to light is combined to make the display panel 201 present color images. It should be understood that the liquid crystal display panel is a passive light emission display panel and requires a backlight module to provide a backlight source for displaying image.

The chip on film 202 is electrically connected to the display panel 201. The chip on film 202 can comprise various control chips and control circuits, and is configured to control a display function of the display panel 201. It should be understood that the display region AA of the display panel 201 comprises a plurality of display units, and each of the display units is electrically connected to the chip on film 202 through a control wire. Therefore, the chip on film 202 is integrated with a great amount of control wires, control circuits, and control chips, and needs to occupy a larger frame region, which results in a width of a frame on the side of the display screens disposed with the chip on film being significantly greater than a width of remaining frames disposed without the chip on film.

In an embodiment, the chip on film 202 is disposed near the first frame 301. Specifically, the chip on film 202 is disposed on a side of the display screens near the first frame 301. In the present embodiment, disposing the chip on film 202 near the first frame 301 makes a space occupied by the chip on film 202 concentrated near the first frame 301 to create a condition for the second frame 302 of the display screens to have a smaller width.

In an embodiment, the light-emitting element 102 and the chip on film 202 are disposed on the same side of the display screens. Specifically, the light-emitting element 102 and the chip on film 202 are disposed along the first frame 301 such that a frame region occupied by the light-emitting element 102 and the chip on film 202 is concentrated on the first frame 301 to be conducive for reduction of the frame width of the second frame 302 to achieve a narrow frame of at least one side of the display screens. It should be understood that the display screens provided by the present embodiment is used to manufacture a multi-screen, and employing the first frame 302 as a splicing edge is conducive for reduction of a width of the splicing gap of the multi-screen to improve visual aesthetics of the multi-screen.

The outer bezel is fixed on the light exiting surface and the side surface of the display screens, and is configured to fix and protect the backlight module 10 and the display module 20. The outer bezel has an aperture defined to correspond to the display region AA of the display panel 201, and is configured to expose the display region AA of the display panel 201 to guarantee the display screens to display images normally.

In an embodiment, the outer bezel comprises a first frame 301 and a second frame 302. A width of the first frame 301 extending toward a central region of the display screens is a width B1 of the first frame 301, and a width of the second frame 302 extending toward the central region of the display screens is a width B2 of the second frame 302. The width B1 of the first frame 301 is greater than the width B2 of the second frame 302. For example, the width B1 of the first frame 301 is 8 millimeters, and the width B2 of the second frame 302 is 2 millimeters. It should be explained that the width B1 of the first frame 301 and the width B2 of the second frame 302 represent frame widths of two opposite sides of the display screens, respectively. In the embodiment of the present application, the frame widths of the two opposite sides of the display screens are unequal, and the width B2 of the second frame 302 is less than the width B1 of the first frame 301. When the display screens are used to manufacture the multi-screen, using the second frame 302 as a splicing edge can achieve the multi-screen including the smaller splicing gap width to improve display effect of the multi-screen.

In an embodiment, the width B1 of the first frame 301 is twice the width B2 of the second frame 302. For example, the width B1 of the first frame 301 is 8 millimeters, and the width B2 of the second frame 302 is 4 millimeters. In the present embodiment, when the two display screens are spliced into the multi-screen, using the second frames 302 of the two display screens as a splicing edge makes a width of the splicing gap of the multi-screen formed finally equal to the width B1 of the first frame 301. For example, when the widths B1 of the first frames 301 of the two display screens are 8 millimeters and the widths B2 of the second frames 302 are 4 millimeters, these two display screens along the second frames 302 are spliced to form a multi-screen and a with a width of the splicing gap of the multi-screen is 8 millimeters, which is the same as the width B1 of the first frame 301 such that the multi-screen presents a more regular appearance to improve visual aesthetics of the multi-screen.

In an embodiment, a plane on which the light exiting surface of the display panel 201 is located serves as a reference plane S, and an orthographic projection of the first frame 301 on the reference plane S covers an orthographic projection of the light-emitting element 102 on the reference plane S. Furthermore, the orthographic projection of the first frame 301 on the reference plane S covers an orthographic projection of the chip on film 202 on the reference plane S. It should be understood that based on the light-emitting element 102 and the chip on film 202 disposed along the first frame 301, disposing the first frame 301 with a certain width can achieve simultaneously shielding the light-emitting element 102 and the chip on film 202. The design of the present embodiment can achieve the first frame 301 simultaneously shielding the light-emitting element 102 and the chip on film 202.

Furthermore, the display panel 201 comprises a display region AA and a non-display region NA, and an orthographic projection of an outer bezel on the display panel 201 covers the non-display region NA. An aperture is defined in the outer bezel, and an orthographic projection of the aperture of the outer bezel on the display panel 201 covers the display region AA. The above design of the present embodiment not only guarantees fixing and protection of the outer bezel for the display panel 201 but also prevents the outer bezel from blocking exiting light from the display panel 201.

The embodiment of the present application provides a multi-screen, the multi-screen comprises at least two display screens provided by the embodiment as shown in FIG. 1 spliced with each other, and at least one of adjacent two of the display screens is spliced along the second frame. Based on the embodiment shown in FIG. 1, optimizing the locations of the chip on film and the light-emitting element in the display screens makes the width of the first frame greater than the width of the second frame in the display screens. When the display screens are used to manufacture the multi-screen, the second frame serves as a splicing edge such that the multi-screen is formed to have a smaller splicing gap, which improves display quality and aesthetics of the multi-screen.

Figure 2:
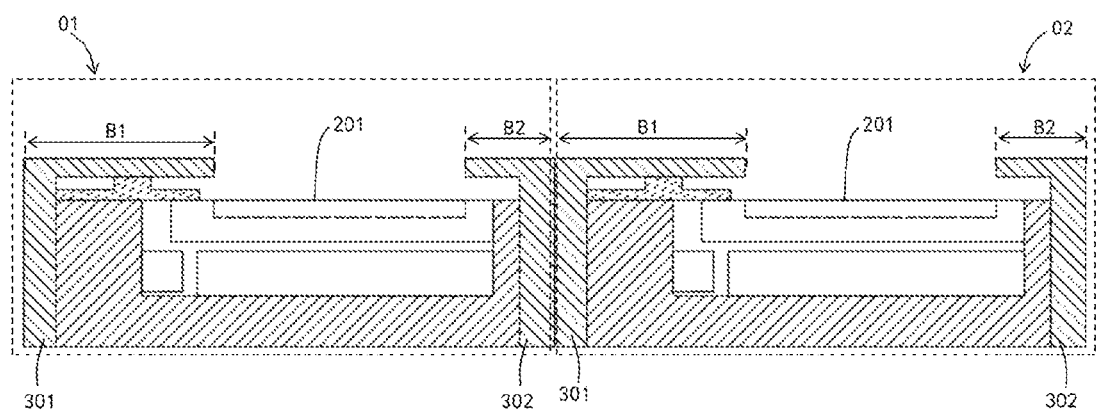
FIG. 2 is a schematic structural view of a first multi-screen provided by the embodiment of the present application.

In an embodiment, With reference to FIGS. 1 and 2, FIG. 2 is a schematic structural view of the first multi-screen provided by the embodiment of the present application. The multi-screen comprises a first display screen 01 and a second display screen 02. The first display screen 01 and the second display screen 02 are the display screens as shown in FIG. 1. Structures and characteristics of the first display screen 01 and the second display screen 02 refer to the above embodiment, and will not be described in detail repeatedly here.

The first display screen 01 and the second display screen 02 form the multi-screen by an edge splicing manner. Specifically, an outer bezel of the first display screen 01 comprises a first frame 301 and a second frame 302 opposite to the first frame. A width B1 of the first frame 301 of the first display screen 01 is greater than a width B2 of the second frame 302 of the first display screen 01. An outer bezel of the second display screen 02 comprises a first frame 301 and a second frame 302 opposite to the first frame 301. A width B1 of the first frame 301 of the second display screen 02 is greater than a width B2 of the second frame 302 of the second display screen 02.

The second frame 302 of the first display screen 01 is spliced with the first frame 301 of the second display screen 02. Specifically, a side surface of the second frame 302 of the first display screen 01 is flush horizontally with and spliced securely with a side surface of the first frame 301 of the second display screen 02, and simultaneously a light exiting surface of the display panel 201 of the first display screen 01 and a light exiting surface of the display panel 201 of the second display screen 02 are kept on the same level plane. Optionally, a fixing manner for fixing the side surface of the second frame 302 of the first display screen 01 and the side surface of the first frame 301 of the second display screen 02 can be adhering, soldering, or riveting. In the present embodiment, using the second frame 302 of the first display screen 01 including the smaller frame width as splicing edge is conducive for reduction of the width of the splicing gap of the multi-screen. Furthermore, the first display screen 01 and the second display screen 02 use the display screens provided by the above embodiment of the present application such that display screens for manufacturing the multi-screen are uniform, which is conducive for simplification of manufacturing processes for the multi-screen and increase of production efficiency.

Optionally, according to the method provide by the present embodiment, the first display screen 01 and the second display screen 02 are spliced in a first row to form a multi-screen of the first row, a multi-screen of a second row can further be formed on a side of the multi-screen of the first row according to the method provided by the present embodiment, and the multi-screen of the first row is aligned and spliced with the multi-screen of the second to form a complete multi-screen to further increase a vertical size of the multi-screen.

It should be explained that the multi-screen provided by the present embodiment comprises two display screens but is not limited thereto, and can splice more display screens along the same direction according to the splicing method provided by the present embodiment to form a multi-screen with a larger size.

Figure 3:
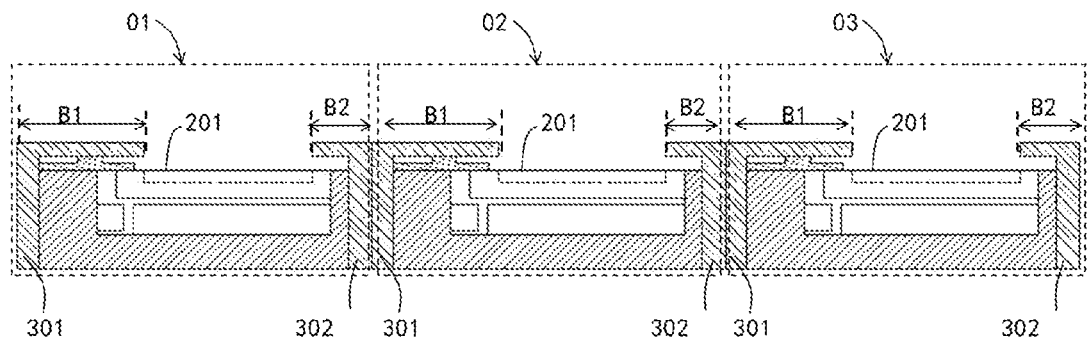
FIG. 3 is a schematic structural view of a second multi-screen provided by the embodiment of the present application.

In an embodiment, with reference to FIGS. 1 and 3, FIG. 3 is a schematic structural view of the second multi-screen provided by the embodiment of the present application. The multi-screen comprises a first display screen 01, a second display screen 02, and a third display screen 03. The first display screen 01, the second display screen 02, and the third display screen 03 are the display screens as shown in FIG. 1. Structures and characteristics of the first display screen 01, the second display screen 02, and the third display screen 03 refer to the above embodiment, and will not be described in detail repeatedly here.

The first display screen 01, the second display screen 02, and the third display screen 03 are spliced sequentially to form the multi-screen. Specifically, an outer bezel of the first display screen 01 comprises a first frame 301 and a second frame 302 opposite to the first frame. A width B1 of the first frame 301 of the first display screen 01 is greater than a width B2 of the second frame 302 of the first display screen 01. An outer bezel of the second display screen 02 comprises a first frame 301 and a second frame 302 opposite to the first frame 301. A width B1 of the first frame 301 of the second display screen 02 is greater than a width B2 of the second frame 302 of the second display screen 02. An outer bezel of the third display screen 03 comprises a first frame 301 and a second frame 302 opposite to the first frame 301. A width B1 of the first frame 301 of the third display screen 03 is greater than a width B2 of the second frame 302 of the third display screen 03.

The second frame 302 of the first display screen 01 is spliced with the first frame 301 of the second display screen 02. Specifically, a side surface of the second frame 302 of the first display screen 01 is flush horizontally with and spliced securely with a side surface of the first frame 301 of the second display screen 02, and simultaneously a light exiting surface of the display panel 201 of the first display screen 01 and a light exiting surface of the display panel 201 of the second display screen 02 are kept on the same level plane. Optionally, a fixing manner for fixing the side surface of the second frame 302 of the first display screen 01 and the side surface of the first frame 301 of the second display screen 02 can be adhering, soldering, or riveting.

The second frame 302 of the second display screen 02 is spliced with the first frame 301 of the third display screen 03. Specifically, the side surface of the second frame 302 of the second display screen 02 is flush horizontally with and spliced with the side surface of the first frame 301 of the third display screen 03 and simultaneously a light exiting surface of the display panel 201 of the second display screen 02 and a light exiting surface of the display panel 201 of the third display screen 03 are kept on the same plane. Optionally, a fixing manner for fixing the side surface of the second frame 302 of the second display screen 02 and the side surface of the first frame 301 of the third display screen 03 can be adhering, soldering, or riveting.

In the present embodiment, by using the second frame 302 of the first display screen 01 and the second frame 302 of the second display screen 02 including smaller frame widths as splicing edges, it is conducive for reducing a width of the splicing gap in the multi-screen. Furthermore, the first display screen 01, the second display screen 02, and the third display screen 03 employ the display screens provided by the above embodiment of the present application such that display screens for manufacturing the multi-screen are uniform, which is conducive for simplification of manufacturing processes for the multi-screen and increase of production efficiency.

Optionally, the first display screen 01, the second display screen 02, and the third display screen 03 are spliced in a first row to form a multi-screen of the first row according to the method provided by the present embodiment, a multi-screen of a second row can further be formed according to the method provided by the present embodiment, and the multi-screen of the first row is aligned and spliced with the multi-screen of the second to form a complete multi-screen to further increase a vertical size of the multi-screen.

Figure 4:
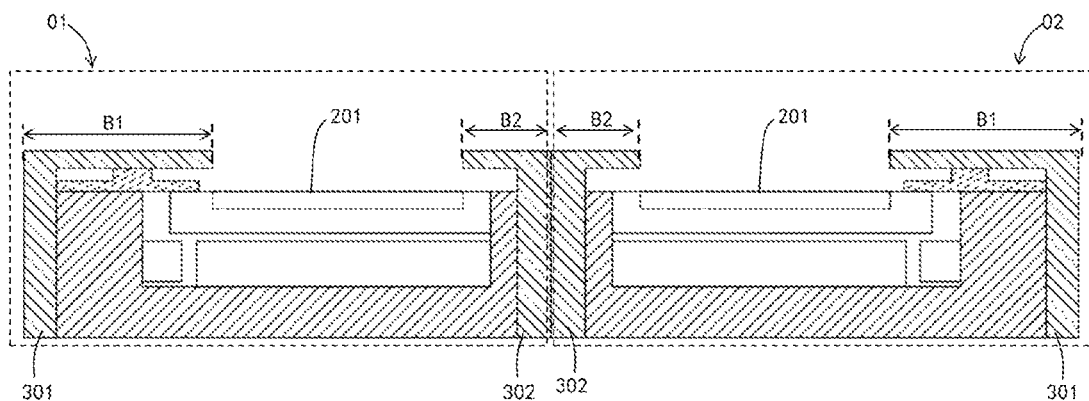
FIG. 4 is a schematic structural view of a third multi-screen provided by the embodiment of the present application.

In an embodiment, With reference to FIGS. 1 and 4, FIG. 4 is a schematic structural view of the third multi-screen provided by the embodiment of the present application. In the present embodiment, the multi-screen comprises a first display screen 01 and a second display screen 02. The first display screen 01 and the second display screen 02 are the display screens as shown in FIG. 1. Structures and characteristics of the first display screen 01 and the second display screen 02 refer to the above embodiment, and will not be described in detail repeatedly here.

The outer bezel of the first display screen 01 comprises a first frame 301 and a second frame 302 opposite to the first frame 301. A width B1 of the first frame 301 of the first display screen 01 is greater than a width B2 of the second frame 302 of the first display screen 01. The outer bezel of the second display screen 02 comprises a first frame 301 and a second frame 302 opposite to the first frame 301. A width B1 of the first frame 301 of the second display screen 02 is greater than a width B2 of the second frame 302 of the second display screen 02.

The first display screen 01 and the second display screen 02 form the multi-screen in form of edge splicing. Specifically, the second frame 302 of the first display screen 01 is spliced with the second frame 302 of the second display screen 02 and simultaneously the light exiting surface of the display panel 201 of the first display screen 01 and the light exiting surface of the display panel 201 of the second display screen 02 are kept in the same level plane. Optionally, a fixing manner for fixing the first display screen 01 and the second display screen 02 can be adhering, soldering, or riveting. The present embodiment uses the second frame 302 of the first display screen 01 and the second frame 302 of the second display screen 02 including the smaller frame widths as a splicing edge to minimize the width of the splicing gap of the formed multi-screen, which is conducive for improvement of display quality of the multi-screen. Furthermore, the first display screen 01 and the second display screen 02 employ the display screens provided by the above embodiment of the present application such that display screens for manufacturing the multi-screen are uniform, which is conducive for simplification of manufacturing processes for the multi-screen and increase of production efficiency.

Optionally, according to the method provide by the present embodiment, the first display screen 01 and the second display screen 02 are spliced in a first row to form a multi-screen of the first row, a multi-screen of a second row can further be formed on a side of the multi-screen of the first row according to the method provided by the present embodiment, and the multi-screen of the first row is aligned and spliced with the multi-screen of the second to form a complete multi-screen to further increase a vertical size of the multi-screen.

Furthermore, in the present embodiment, when the second frame 302 of the first display screen 01 is spliced with the second frame 302 of the second display screen 02, the second display screen 02 is required to rotate for 180 degrees relative to the first display screen 01. However, to guarantee uniformity of image display of the multi-screen display image, a display mode of the second display screen 02 is required to be adjusted to according to a display mode of the first display screen 01 to guarantee that both the first display screen 01 and the second display screen 02 start to display from the same side of the multi-screen.

Optionally, the first frame 301 comprises a first end and a second end opposite to the first end. In the present embodiment, because the second frame 302 of the first display screen 01 is not spliced with the second frame 302 of the second display screen 02, the first end of the first display screen 01 and the second end of the second display screen 02 are on the same side of the multi-screen. The first display screen 01 inputs an initial display signal into first end of the first display screen 01. Therefore, the first display screen 01 starts to display images from the first end. The second display screen 02 inputs an initial display signal into the second end of the second display screen 02. Therefore, the second display screen 02 starts to display images from the second end. Under prerequisite of the first end of the first display screen 01 and the second end of the second display screen 02 being on the same side of the multi-screen, the multi-screen displays images from a side thereof to prevent display disorder between the display image of the first display screen 01 and the display image of the second display screen 02.

Optionally, the width B1 of the first frame 301 of the first display screen 01 is twice the width B2 of the second frame 302 of the first display screen 01, and the width B1 of the first frame 301 of the second display screen 02 is twice the width B2 of the second frame 302 of the second display screen 02. The present embodiment can make a width of a splicing gap formed in the multi-screen equal to the width B1 of the first frame 301 of the first display screen 01 and the width B1 of the first frame 301 of the second display screen 02 such that the multi-screen presents a more regular appearance to improve visual aesthetics of the multi-screen.

As described above, the multi-screen provided by the embodiment of the present application comprises at least two display screens spliced to each other. The display screens comprise an outer bezel, a backlight module, and a display panel, and the outer bezel comprises a first frame and a second frame opposite to the first frame. The backlight module comprises a light-emitting element disposed near the first frame. The display module comprises a chip on film disposed near the first frame. At least one of adjacent two of the display screens is spliced along the second frame. The embodiment of the present application, by optimizing the locations of the chip on film and the light-emitting element in the display screens, makes the width of the first frame greater than the width of the second frame, and employs the second frame as a splicing edge to make the multi-screen have a smaller splicing gap, which improves display quality and aesthetics of the multi-screen.

The embodiment of the present application further provides a display device, and the display device comprises the multi-screen provided by the embodiment of the present application.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A multi-screen, comprising at least two display screens spliced together, each of the display screens comprising:
    an outer bezel, comprising a first frame and a second frame opposite to the first frame;
    a backlight module, disposed in a bezel body of the outer bezel, and comprising a light-emitting element, wherein the light-emitting element is disposed near the first frame; and
    a display module disposed in the bezel body of the outer bezel, located on a light exiting surface of the backlight module, and comprising a display panel and a chip on film electrically connected to the display panel, wherein the chip on film is disposed near the first frame;
    wherein at least one of adjacent two of the display screens is spliced along the second frame;
    wherein a plane on which a light exiting surface of the display panel is located serves as a reference plane, and an orthographic projection of the first frame on the reference plane covers an orthographic projection of the light-emitting element on the reference plane;
    wherein the orthographic projection of the first frame on the reference plane covers an orthographic projection of the chip on film on the reference plane.

2. The multi-screen according to claim 1, wherein the light-emitting element and the chip on film are disposed on a same side of the display screens.

3. The multi-screen according to claim 1, wherein the display screens comprise a first display screen and a second display screen, and the second frame of the first display screen is horizontally spliced with the first frame of the second display screen.

4. The multi-screen according to claim 3, wherein the display screens further comprise a third display screen, and the first frame of the third display screen is spliced with the second frame of the second display screen.

5. The multi-screen according to claim 3, wherein a light exiting surface of the display panel of the first display screen and a light exiting surface of the display panel of the second display screen are coplanar.

6. The multi-screen according to claim 4, wherein a light exiting surface of the display panel of the first display screen, a light exiting surface of the display panel of the second display screen, and a light exiting surface of the display panel of the third display screen are coplanar.

7. The multi-screen according to claim 1, wherein the display screens comprise a first display screen and a second display screen, and the second frame of the first display screen is spliced with the second frame of the second display screen.

8. The multi-screen according to claim 7, wherein the first frame comprises a first end and a second end opposite to the first end, the first display screen inputs an initial display signal through the first end of the first display screen, and the second display screen inputs an initial display signal through the second end of the second display screen.

9. The multi-screen according to claim 1, wherein a width of the first frame is greater than a width of the second frame.

10. The multi-screen according to claim 9, wherein the width of the first frame is twice the width of the second frame.

11. The multi-screen according to claim 1, wherein the backlight module further comprises a rear frame and an optical module, and the light-emitting element and the optical module are disposed in the rear frame.

12. The multi-screen according to claim 11, wherein the rear frame comprises a bottom plate and a side plate, and the side plate is disposed along the first frame and the second frame.

13. The multi-screen according to claim 11, wherein the light-emitting element is disposed on a side of the side plate facing the optical module.

14. The multi-screen according to claim 11, wherein the chip on film is disposed on a side of the display screen near the first frame.

15. The multi-screen according to claim 1, wherein the display panel comprises a display region and a non-display region, and an orthographic projection of the outer bezel on the display panel covers the non-display region.

16. The multi-screen according to claim 15, wherein an aperture is defined in the outer bezel, and an orthographic projection of the aperture of the outer bezel on the display panel covers the display region.

17. A display device, comprising the multi-screen according to claim 1.

18. A display device, comprising a first display screen and a second display screen spliced with the first display screen;
    wherein each of the first display screen and the second display screen comprises an outer bezel, a backlight module disposed in a bezel body of the outer bezel, and a display module disposed on a light exiting surface of the backlight module;
    wherein the outer bezel comprises a first frame and a second frame opposite to the first frame;
    wherein the backlight module comprises a light-emitting element, and the light-emitting element is disposed near the first frame;
    wherein the display module comprises a display panel and a chip on film electrically connected to the display panel, and the chip on film is disposed near the first frame;
    wherein a width of the first frame is greater than a width of the second frame; and
    wherein the second frame of the first display screen is spliced with the second frame of the second display screen;

wherein a plane on which a light exiting surface of the display panel is located serves as a reference plane, and an orthographic projection of the first frame on the reference plane covers an orthographic projection of the light-emitting element on the reference plane;
wherein the orthographic projection of the first frame on the reference plane covers an orthographic projection of the chip on film on the reference plane.

\* \* \* \* \*